United States Patent
Agrawal et al.

(10) Patent No.: US 12,166,767 B2
(45) Date of Patent: Dec. 10, 2024

(54) ELECTRONIC DEVICE THAT RECEIVES AND PRESENTS PRIVATE AUGMENTED REALITY MESSAGES BETWEEN TWO USERS

(71) Applicant: MOTOROLA MOBILITY LLC, Wilmington, DE (US)

(72) Inventors: Amit Kumar Agrawal, Bangalore (IN); Alexandre Neves Creto, Sao Paulo (BR)

(73) Assignee: Motorola Mobility LLC, Chicago, IL (US)

( * ) Notice: Subject to any disclaimer, the term of this patent is extended or adjusted under 35 U.S.C. 154(b) by 407 days.

(21) Appl. No.: 17/557,663

(22) Filed: Dec. 21, 2021

(65) Prior Publication Data
US 2023/0198995 A1    Jun. 22, 2023

(51) Int. Cl.
H04L 9/40        (2022.01)
G06F 3/14        (2006.01)

(52) U.S. Cl.
CPC .............. H04L 63/105 (2013.01); G06F 3/14 (2013.01); H04L 63/08 (2013.01)

(58) Field of Classification Search
None
See application file for complete search history.

(56) References Cited

U.S. PATENT DOCUMENTS

| | | | | |
|---|---|---|---|---|
| 9,092,600 | B2 * | 7/2015 | Scavezze | H04L 63/08 |
| 2014/0125574 | A1 * | 5/2014 | Scavezze | G06F 21/34 |
| | | | | 345/156 |
| 2014/0282911 | A1 * | 9/2014 | Bare | H04L 67/131 |
| | | | | 726/4 |
| 2015/0200922 | A1 * | 7/2015 | Eschbach | H04L 63/08 |
| | | | | 358/1.14 |
| 2016/0242035 | A1 * | 8/2016 | Chaillan | H04W 4/029 |
| 2018/0276895 | A1 * | 9/2018 | Hodge | G06V 20/20 |

FOREIGN PATENT DOCUMENTS

EP       3318944 A2 *  5/2018  ......... G05B 23/0216

* cited by examiner

*Primary Examiner* — Kaveh Abrishamkar
(74) *Attorney, Agent, or Firm* — Isidore PLLC

(57) ABSTRACT

An electronic device, computer program product, and method provide private messaging between people at a frequented location by using one or more AR display devices. The electronic device communicatively connects to a particular AR display device and attempts to identify access credentials to the electronic device of a particular person wearing the particular AR display device. The electronic device identifies that the particular person is a second person has limited access credentials, at the electronic device, to an AR user interface for leaving a private AR message intended for a first person who has full access credentials to the electronic device. The electronic device presents, at the particular AR display device, the AR user interface. The electronic device receives an AR private message from the particular AR display device and stores the AR private message for retrieval at the electronic device by first person.

20 Claims, 10 Drawing Sheets

ELECTRONIC DEVICE THAT RECEIVES AND PRESENTS PRIVATE AUGMENTED REALITY MESSAGES BETWEEN TWO USERS

BACKGROUND

1. Technical Field

The present disclosure relates generally to electronic devices, and more particularly to electronic devices that present augmented reality display content.

2. Description of the Related Art

Augmented reality (AR) technology has been integrated into user worn eyeglasses and other user worn devices to provide a transparent display surface that is positioned before the eyes of a user. The AR technology combines natural imagery with displayed content to assist users and provide the user with a more intuitive, immersive experience. AR glasses or goggles track the head position and location of the device wearer to provide relevant information, such as navigation directions. Content streaming for AR glasses is often accomplished/supported with the use of a connected communication device, such as a smart phone.

With more people having their own user communication devices, such as smartphones, messages (e.g., notes and replies) are frequently exchanged between the two respective communication devices of the two persons. The message can be prepared and sent at any time for the recipient to access and read at a later time. However, not every person has their own communication device, as often occurs with families in which the parents have but the children do not have a smart phone. In these instances, the child without a smart phone has to rely on the old fashion written notes or direct verbal communication to the parent with the device. The use of physical notes and/or requirement for direct verbal communication can lead to a lack of privacy or missed opportunities for communicating when both persons are not in the same temporal space. For example, when the child leaves a note for one parent to retrieve at a later time, the notes are subject to being discovered and read by the other parent or siblings, who are not the intended recipient. The intended recipient may never see the note if the note is removed from its physical location by someone else.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
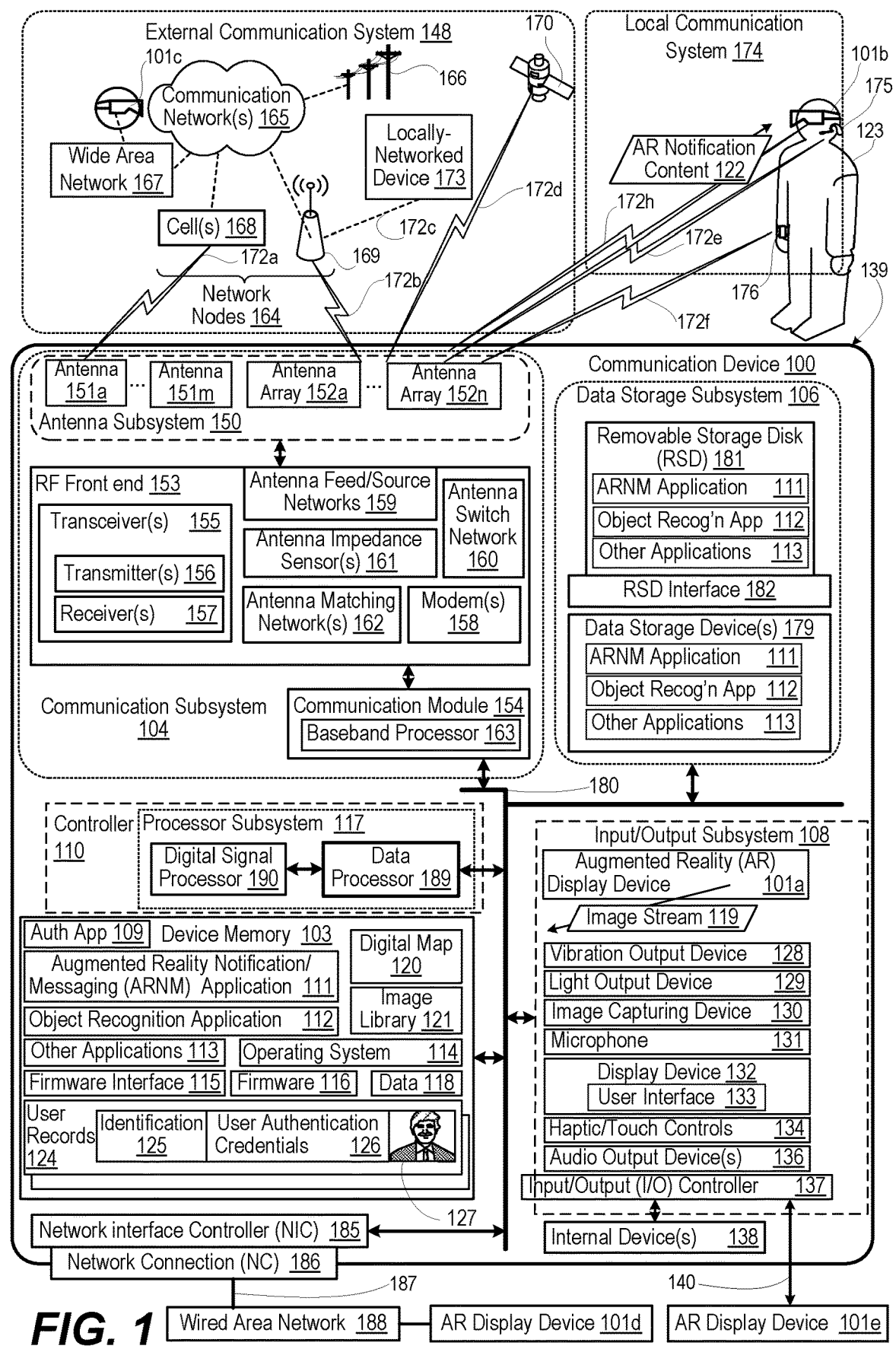
FIG. 1 depicts a functional block diagram of a communication environment including a communication device having components that provide augmented reality (AR) notifications and messaging at AR display device(s), and within which the features of the present disclosure are advantageously implemented, according to one or more embodiments.

According to a first aspect of the present disclosure, an electronic device, a computer program product, and a method provides management of the presentation of authorized messages (e.g., notes and replies) exchanged between an owner of the electronic device and other persons in a private manner using an augmented reality (AR) display device. The other person can be a registered person having access credentials to the owner's electronic device or an unregistered persons, who can be allowed to leave a note via the AR display device along with identification data, such as a picture. The electronic device includes at least one communication interface that communicatively connects the electronic device to one or more AR display devices. The electronic device includes a memory that stores a first user record associated with a first person having full access credentials to access and use the electronic device. The memory can also store a second user record associated with a second person having limited access credentials to access/use the electronic device. A controller of the electronic device is communicatively coupled to the at least one communication interface and the memory. In response to communicatively connecting to a particular AR display device of the one or more AR display devices, the controller identifies whether the particular person wearing the particular AR display device has access credentials to access the electronic device. Once the particular person is authenticated as having the access credentials, messages intended to be seen by that particular person are presented on the AR display device tethered to the communication device or to another object within the FOV of the AR display device. Additionally, the particular person can create messages to be presented only to another specific authorized user of the device when that other authorized user connects to the communication device using the AR display device. The person can create messages by entering text using a virtual keypad or by verbally dictating a new message that is stored in memory on AR display device or transferred to a storage in the electronic device or a remote storage to which AR display device is communicatively connected via a wired/wireless network.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 depicts a functional block diagram of an electronic device, specifically communication device 100, that provides AR notifications and messaging at augmented reality (AR) display device(s) 101a-101e (collectively 101), within an operating environment in which several of the features of the present disclosure are advantageously implemented. Referring now to the specific component makeup and the associated functionality of communication device 100. Communication device 100 may be communicatively coupled to one or more AR display devices 101a-101e respectively by an interlinked connection, wireless connection, cellular over-the-air connection, network connection, or peripheral (tethered) connection. In one or more embodiments, communication device 100 includes device memory 103, communication subsystem 104, data storage subsystem 106, and input/output (I/O) subsystem 108. Device memory 103 and each subsystem (104, 106, and 108) are managed by controller 110. Device memory 103 includes program code for applications, such as authentication application 109, augmented reality notification and messaging (ARNM) application 111, object recognition application 112, and other application(s) 113. Device memory 103 further includes operating system (OS) 114, firmware interface 115, such as basic input/output system (BIOS) or Uniform Extensible Firmware Interface (UEFI), and firmware 116.

Controller 110 includes processor subsystem 117, which executes program code to provide operating functionality of communication device 100 that associates and communicates AR notification content tethered to active and passive objects within a field of view of AR display device(s) 101a-101e. The software and/or firmware modules have varying functionality when their corresponding program code is executed by processor subsystem 117 or secondary processing devices within communication device 100. Processor subsystem 117 of controller 110 can execute program code of authentication application 109, ARNM application 111, object recognition application 112, and other application(s) 113 to configure communication device 100 to perform specific functions including functionality described herein such as authenticating/identifying users. Device memory 103 can include data 118 used by the applications. In one or more embodiments, controller 110 executes ARNM application 111 to configure communication device 100 to receive image stream 119 from a particular one of AR display device(s) 101a-101e. ARNM application 111 maintains digital map 120 and image library 121 of passive and active objects. Digital map 120 may include three-dimensional locations of objects defined in geospatial coordinates or relative vector locations from interior references. Digital map 120 may include exterior topographical features and interior obstructions such as walls, ceilings, floors, doors, and furniture. Image library 121 includes one or more of visual representations and three-dimensional shape representations of objects. The representations may include dimensional data. Each representation may be tagged with identification data of a type of object or a specific object.

In one or more embodiments, digital map 120 and image library 121 are sent to communication device 100. In an example, communication device 100 downloads image library 121 from a network server and downloads digital map 120 from a home automation system that is linked to local active objects. In another example, communication device 100 generates or updates digital map 120 and image library 121. In an example, communication device 100 generates or updates digital map 120 using location data obtained from location services, such as by receiving signals from GPS satellites 170 or triangulating from base nodes 164. Objects identified in image streams 119 may be represented with identification and location in digital map 120. Still images extracted from image streams 119 may be added to image library 121. ARNM application 111 generates notification content 122 that is communicated to a particular one of AR display device(s) 101a-101e for presenting to person 123 who is wearing the particular one of AR display device(s) 101a-101e. In one or more embodiments, ARNM application 111 attempts to authenticate person 123 by accessing user records 124 that may contain identification information 125, user authentication credentials 126, and/or biometric information, such as a digital image 127. As utilized herein, reference to person 123 may extend to a human person, an animal, or an artificial person.

I/O subsystem 108 includes user interface components such as vibration output device 128, light output device 129, image capturing device(s) 130, microphone 131, display device 132 that presents user interface 133, touch/haptic controls 134, and audio output device(s) 136. I/O subsystem 108 also includes I/O controller 137.

I/O controller 137 provides communication and power signals to functional components of device memory 103, communication subsystem 104, data storage subsystem 106, or I/O subsystem 108. I/O controller 137 connects to internal devices 138, which are internal to housing 139. I/O controller 137 connects to tethered peripheral devices such as AR display device 101e, which are external to housing 139 of communication device 100. Internal devices 138 include computing, storage, communication, or sensing components depicted within housing 139. I/O controller 137 supports the necessary configuration of connectors, electrical power, communication protocols, and data buffering to act as an interface between internal devices 138 and peripheral devices, such as AR display device 101e, and other components of communication device 100 that use a different configuration for inputs and outputs.

Communication device 100 may be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring now to the communication components and features of communication device 100. Communication subsystem 104 of communication device 100 enables wireless communication with external communication system 148. Communication subsystem 104 includes antenna subsystem 150 having lower band antennas 151a-151m and higher band antenna arrays 152a-152n that can be attached in/at different portions of housing 139. Communication subsystem 104 includes radio frequency (RF) front end 153 and communication module 154. RF front end 153 includes transceiver(s) 155, which includes transmitter(s) 156 and receiver(s) 157. RF front end 153 further includes modem(s) 158. RF front end 153 includes antenna feed/source networks 159, antenna switch network 160, antenna impedance sensor(s) 161, and antenna matching network(s) 162. Communication module 154 of communication subsystem 104 includes baseband processor 163 that communicates with controller 110 and RF front end 153. Baseband processor 163 operates in a baseband frequency range to encode data for transmission and decode received data, according to a communication protocol. Modem(s) 158 modulate baseband encoded data from communication module 154 onto a carrier signal to provide a transmit signal that is amplified by transmitter(s) 156. Modem(s) 158 demodulates each signal received from external communication system 148 using by antenna subsystem 150. The received signal is amplified and filtered by receiver(s) 157, which demodulate received encoded data from a received carrier signal. Antenna feed/source networks 159 transmits or receives from particular portions of antenna subsystem 150 and can adjust a phase between particular portions of antenna subsystem 150. Antenna switch network 160 can connect particular combinations of antennas (151a-151m, 152a-152n) to transceiver(s) 155. Controller 110 can monitor changes in antenna impedance detected by antenna impedance sensor(s) 161 for determining portions of antenna subsystem 150 that are blocked. Antenna matching network(s) 162 are connected to particular lower band antennas 151a-151m to tune impedance respectively of lower band antennas 151a-151m to match impedance of transceiver(s) 155. Antenna matching network(s) 162 can also be used to detune the impedance of lower band antennas 151a-151m to not match the impedance of transceiver(s) 155 to electromagnetically isolate a particular antenna.

In one or more embodiments, controller 110, via communication subsystem 104, performs multiple types of over-the-air (OTA) communication with network nodes 164 of external communication system 148. Particular network nodes 164 can be part of communication networks 165 of public land mobile networks (PLMNs) that provide connections to plain old telephone systems (POTS) 166 for voice calls and wide area networks (WANs) 167 for data sessions. WANs 167 can include Internet and other data networks to communication device 100. The particular network nodes 164 can be cellular "cells", base nodes, or base stations 168 that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. With wireless frequency spectrum seemingly ever expanding, additional antennas (151a-151m, 152a-152n) are incorporated to support newer radio access technologies (RATs) and multi band operation. Dual low band (2L) or quad low band (4L) multiple input multiple output (MIMO) operation dictates multiple antennas communicate on multiple bands simultaneously.

In one or more embodiments, network nodes 164 can be access node(s) 169 that support wireless OTA communication. Communication subsystem 104 can receive OTA communication from location services such as provided by global positioning system (GPS) satellites 170. Communication subsystem 104 communicates via OTA communication channel(s) 172a with base stations 168. Communication subsystem 104 communicates via wireless communication channel(s) 172b with access node(s) 169. In one or more particular embodiments, access node(s) 169 supports communication using one or more IEEE 802.11 wireless local area network (WLAN) protocols. Wi-Fi™ is a family of wireless network protocols, based on the IEEE 802.11 family of standards, which are commonly used between user devices and network devices that provide Internet access. In one or more particular embodiments, communication subsystem 104 communicates with one or more locally networked devices 173 via wired or wireless link 172c provided by access node(s) 169. Communication subsystem 104 receives GPS signal(s) 172d broadcast by GPS satellites 170 to obtain geospatial location information.

In one or more embodiments, controller 110, via communication subsystem 104, performs multiple types of OTA communication with local communication system 174. In one or more embodiments, local communication system 174 includes wireless headset 175 and smart watch 176 that are coupled to communication device 100 to form a personal access network (PAN). Communication subsystem 104 communicates via low power wireless communication channel(s) 172e with wireless headset 175. Communication subsystem 104 communicates via second low power wireless communication channel(s) 172f, such as Bluetooth, with smart watch 176 such as used by person 123. Communication subsystem 104 can also communicate via wireless mesh protocols such as Zigbee, which is a short-range, low-power, wireless standard (IEEE 802.15.4). Communication subsystem 104 communicates via wireless communication channel(s) 172h with AR display device 101b.

Data storage subsystem 106 of communication device 100 includes data storage device(s) 179. Controller 110 is communicatively connected, via system interlink 180, to data storage device(s) 179. Data storage subsystem 106 provides applications, program code, and stored data on nonvolatile storage that is accessible by controller 110. For example, data storage subsystem 106 can provide a selection of applications and computer data such as ARNM application 111, object recognition application 112, and other application(s) 113 that support or enhance the functionality of AR display device(s) 101a-101e. These applications can be loaded into device memory 103 for execution by controller 110. In one or more embodiments, data storage device(s) 179 can include hard disk drives (HDDs), optical disk drives, and/or solid-state drives (SSDs), etc. Data storage subsystem 106 of communication device 100 can include removable storage device(s) (RSD(s)) 181, which is received in RSD interface 182. Controller 110 is communicatively connected to RSD 181, via system interlink 180 and RSD interface 182. In one or more embodiments, RSD 181 is a non-transitory computer program product or computer readable storage device. Controller 110 can access RSD 181 or data storage device(s) 179 to provision communication device 100 with program code, such as code for ARNM application 111, object recognition application 112, and other application(s) 113.

In one or more embodiments, I/O subsystem 108 includes network interface controller (NIC or "network interface") 185 with a network connection (NC) 186. Network cable 187 connects NC 186 to wired area network 188. NIC 185 can be referred to as a "network interface" that can support one or more network communication protocols. Wired area network 188 can be a local area network (LAN), a campus area network (CAN), a metropolitan area network (MAN), or a wide area network (WAN). For example, NC 186 can be an Ethernet connection. In one embodiment, AR display device 101d is communicatively coupled to wired area network 188.

Controller 110 manages, and in some instances directly controls, the various functions and/or operations of communication device 100. These functions and/or operations include, but are not limited to including, application data processing, communication with second communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Controller 110 includes processor subsystem 117, which includes one or more central processing units (CPUs), depicted as data processor 189. Processor subsystem 117 can include one or more digital signal processors 190 that are integrated with data processor 189. Processor subsystem 117 can include other processors that are communicatively coupled to data processor 189, such as baseband processor 163 of communication module 154. In one or embodiments that are not depicted, controller 110 can further include distributed processing and control components that are external to housing 139 or grouped with other components, such as I/O subsystem 108. Data processor 189 is communicatively coupled, via system interlink 180, to device memory 103. In one or more embodiments, controller 110 of communication device 100 is communicatively coupled via system interlink 180 to communication subsystem 104, data storage subsystem 106, and I/O subsystem 108.

System interlink 180 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 180) are illustrated in FIG. 1, it is to be understood that more, fewer, or different interconnections may be present in other embodiments.

Within the description of the remaining figures, references to similar components presented in a previous figure are provided the same reference numbers across the different figures. Where the named component is presented with different features or functionality, a different reference numeral or a subscripted reference numeral is provided (e.g., 100*a* in place of 100).

Figure 2A:
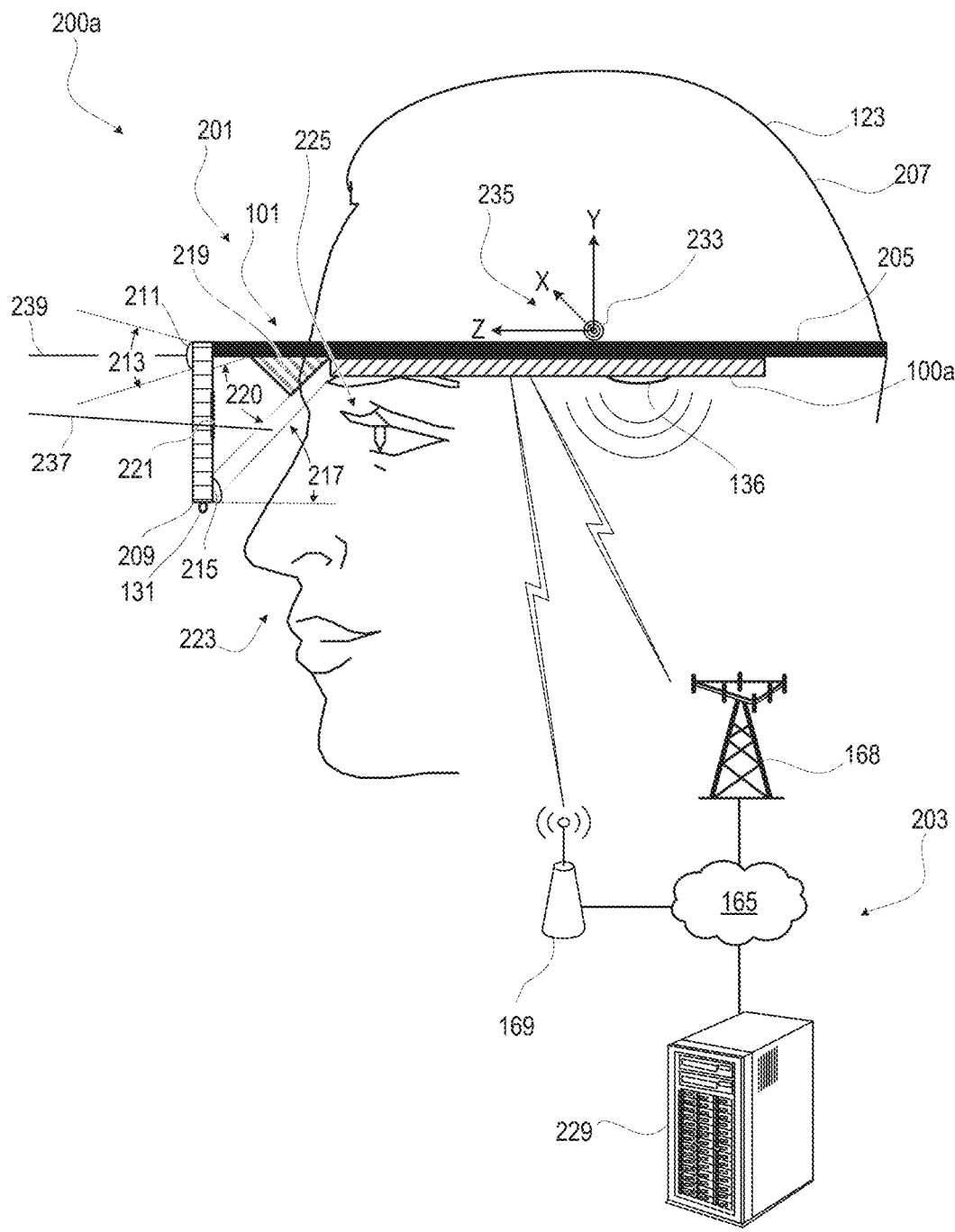
FIG. 2A depicts a first communication environment with an example communication device in communication with an AR display device and in communication with a communication network, according to one or more embodiments.

FIG. 2A depicts first communication environment 200*a* with communication device 100*a* communicatively connected via an interlinked connection with AR display device 101*a* to provide AR display assembly 201. In one or more embodiments, communication device 100*a* may operate as a standalone device. In one or more embodiments, communication device 100*a* may operate in communication with network node 164 (FIG. 1) of communication network 203, such connecting via base station 168 or access node 169 to communication network 165 that can provide AR content from network storage 229. Communication device 100*a* is an implementation of communication device 100 of FIG. 1 and may have similar or identical components. Communication device 100*a* includes components that are compatible with a form factor for an article that is to be worn, carried, or stowed in a clothing pocket by person 123. In an example, communication device 100*a* includes visor or eyeglasses frame 205 that is received on head 207 of person 123 and supports inclusion of optical components of AR display device 101*a* in AR display assembly 201. These optical components include: (i) lenses 209; (ii) first camera 211 that is forward oriented with a first FOV 213; (iii) second camera 215 that is aft oriented with a second FOV 217; and (iv) AR projector 219 having a field of focus 220 to project AR imagery 221 on lenses 209. In one or more embodiments, lenses 209 include an electrochromatic material that darkens in response to a control signal. With no control signal, the electrochromatic material is clear. With increasing voltage level of the control signal, the electrochromatic material becomes darker to a maximum achievable darkness level.

In accordance with one or more embodiments, communication device 100*a* may monitor an image stream from first camera 211 for an ambient light measurement. Communication device 100*a* may monitor an image stream from second camera 215 for imaging a portion of face 223 of person 123, such as for facial recognition or for detecting eye glance direction and eyelid position of eyes 225. AR imagery 221 is aligned with natural imagery by identifying a gaze direction of AR display device 101*a*. Communication device 100*a* translates and rotates with head 207. Communication device 100*a* may determine where head location 233 and head orientation 235 are relative to an interior space or relative to geospatial coordinates. As a first approximation of gaze direction 237 by person 123, boresight 239 of first camera 211 within FOV 213 is oriented generally in line when eyes 225 are gazing straight ahead. As a second approximation of gaze direction 237, second camera 215 directly detects gaze direction 237 of eyes 215.

Person 123 can create messages by entering text using a virtual keypad that is displayed on AR display device 101*a*. First camera 211 detects fingers of user virtually typing on virtual keypad. Alternatively, person 123 verbally dictates a new message that is stored in memory on communication device 100*a* or a remote network storage such as locally-networked device 173 (FIG. 1) to which communication device 100*a* is communicatively connected via a wired/wireless network. In one or more embodiments, communication device 100*a* provides all of the functionality described herein and is sequentially used by two or more users for creating and receiving AR messages that are managed by communication device 100*a*. The single communication device 100*a* can be configured for all members of the family to use it in the home. And the members can then leave each other messages that way.

Figure 2B:
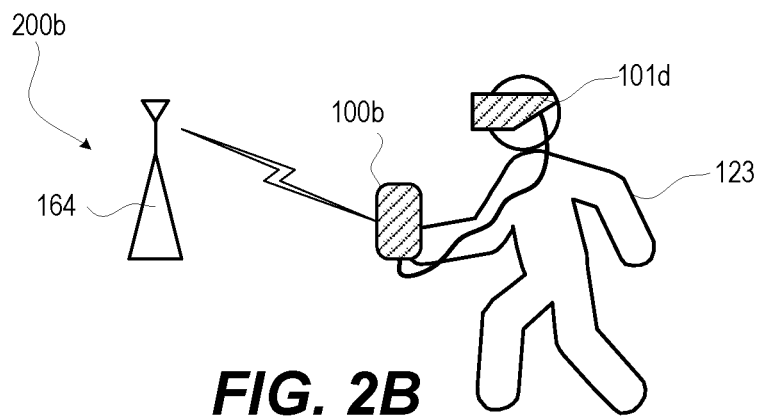
FIG. 2B depicts a second communication environment with an AR display assembly that includes an AR display device communicatively coupled and tethered by electrical cable to the communication device, according to one or more embodiments.

FIG. 2B depicts second communication environment 200*b* with communication device 100*b* communicatively coupled (tethered) by a peripheral connection to AR display device 101*d*. Communication device 100*b* may connect to network node 164 for AR imagery. Controller 110 (FIG. 1) that provides functionality for contextual adaptive brightness control may reside in one or both of AR display device 101*d* and communication device 100*b*. Communication device 100*b* is an implementation of communication device 100 of FIG. 1 and may have similar or identical components. Communication device 100*b* includes components that are compatible with a form factor for an article that is to be worn, carried, or stowed in a clothing pocket by person 123. Communication device 100*b* provides additional user interface features, communication capabilities, additional stored battery power, and content presentation features to AR display device 101*d*.

Figure 2C:
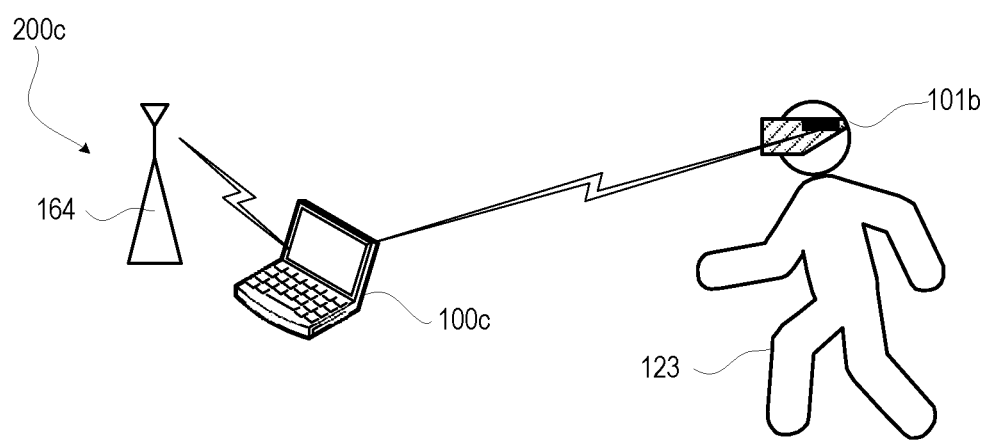
FIG. 2C depicts a third communication environment with an AR display device communicatively coupled via a wireless connection to the communication device, according to one or more embodiments.

FIG. 2C depicts third communication environment 200*c* with communication device 100*c* communicatively connected wirelessly to AR display device 101*b*. Communication device 100*c* may connect to network node 164 for AR imagery. Communication device 100*c* is an implementation of communication device 100 of FIG. 1 and may have similar or identical components. Communication device 100*c* includes components that are compatible with a form factor for fixed, portable, or mobile hand-carried implementations.

Figure 2D:
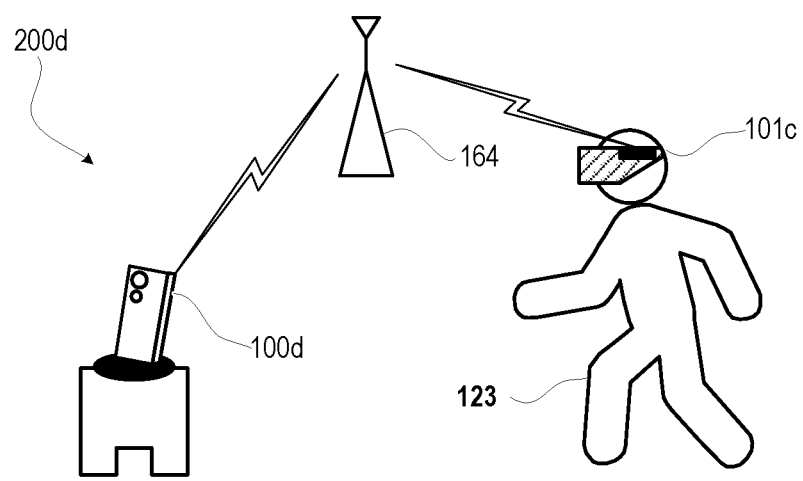
FIG. 2D depicts a fourth communication environment with an AR display device communicatively coupled via an over-the-air connection to the communication device, according to one or more embodiments.

FIG. 2D depicts fourth communication environment 200*d* with communication device 100*d* communicatively connected by a cellular over-the-air connection to AR display device 101*c* via one or more network nodes 164. Communication device 100*d* may connect to network node 164 to retrieve/download AR imagery and connects indirectly to AR display device 101*d* via network node 164. Communication device 100*d* is an implementation of communication device 100 of FIG. 1 and may have similar or identical components. Communication device 100*d* includes components that are compatible with a form factor for fixed, portable, or mobile hand-carried implementations.

Figure 2E:
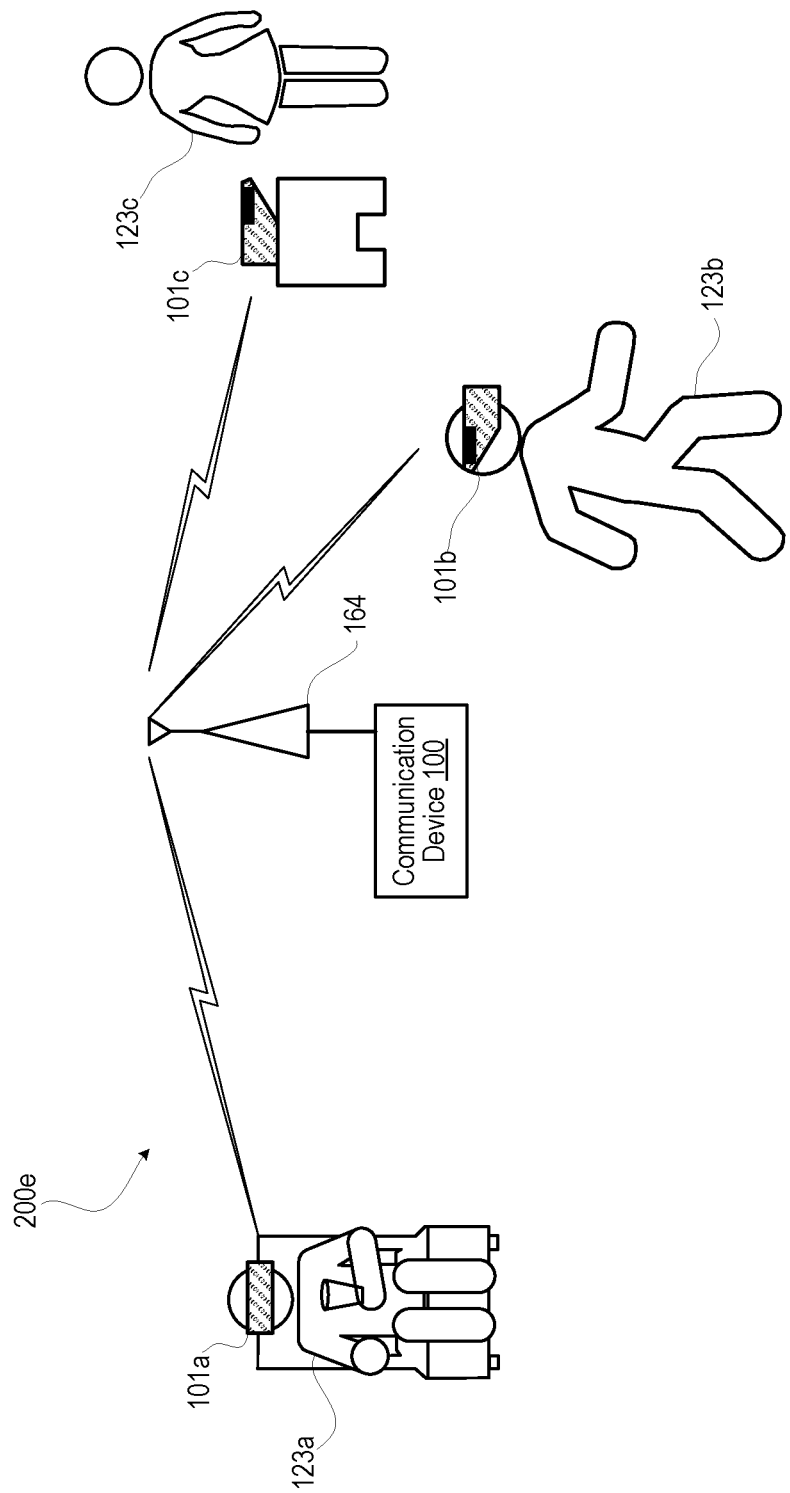
FIG. 2E depicts a fifth communication environment with a communication device such as a home server that is communicatively connected to a network node which in turn enables wireless connection by AR display devices that are respectively used by several persons, according to one or more embodiments.

FIG. 2E depicts fifth communication environment 200*e* with communication device 100*e* such as a home server that is communicatively connected to network node 164 which in turn enables wireless (or wired) connection by AR display device 101*a*-101*c* used on occasion by persons 123*a*-123*c*, respectively. First and second persons 123*a*-123*b* are respectively wearing AR display device 101*a*-101*b*. Third person 123*c* is not wearing AR display device 101*c*. Communication device 100*e* may accept AR messages between different combinations of persons 123*a*-123*c* including messages intended for more than one other person of persons 123*a*-123*c*. In one or more embodiments, AR display devices 101*a*-101*c* may operate as adaptive user interfaces that can communicate with active devices such as communication device 100*e*. Communication device 100*e* provides a messaging hub function for persons 123*a*-123*c*.

Figure 3A:
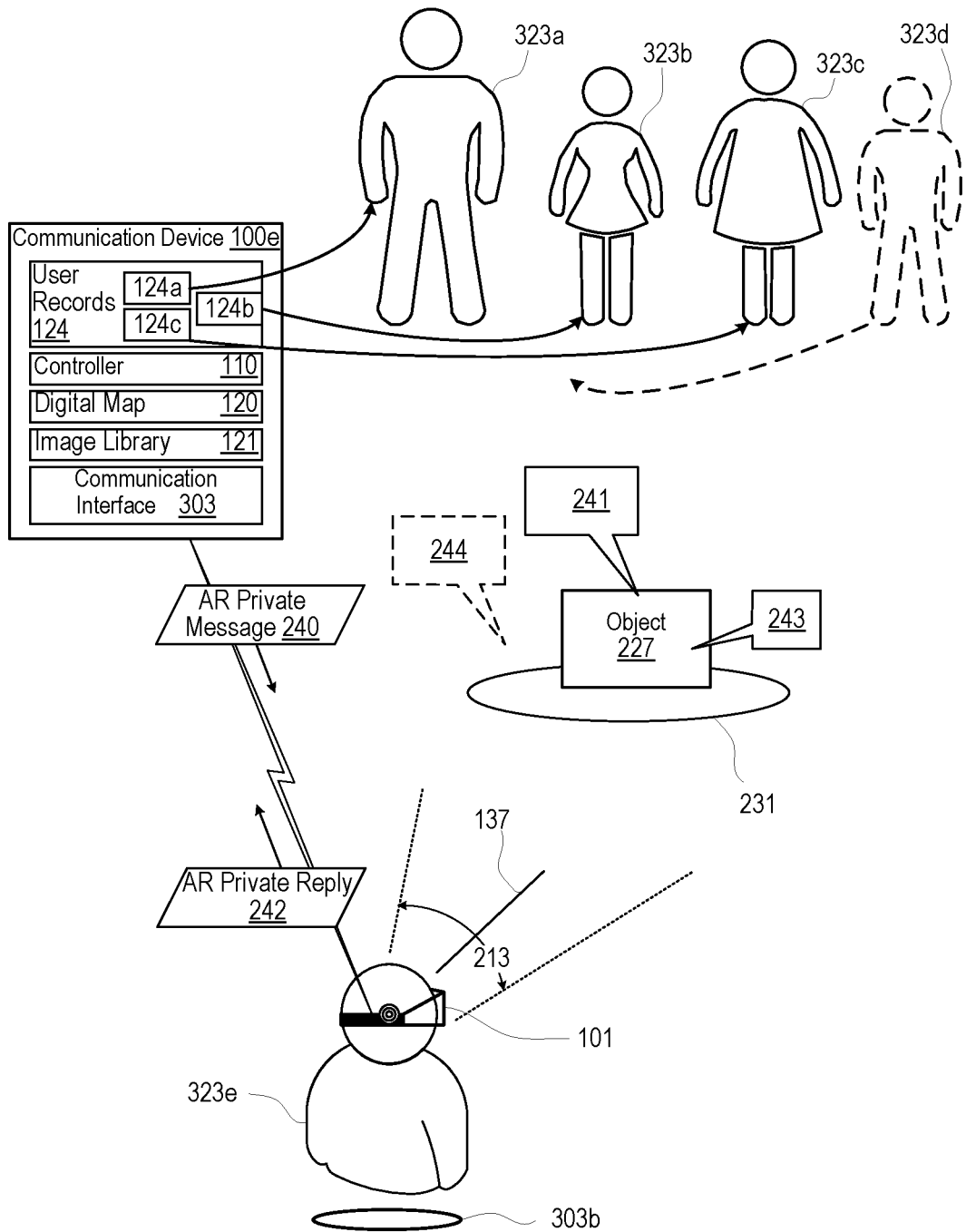
FIG. 3A depicts a fifth communication environment with the communication device sequentially providing AR notification content to the AR display device, according to one or more embodiments.

FIG. 3A depicts sixth communication environment 300 with communication device 100*f* that enables AR display device 101 to act as a private virtual bulletin board for users 323a-323d. Communication device 100f is an implementation of communication device 100 of FIG. 1 and may have similar or identical components. Communication device 100f includes components that are compatible with a form factor for fixed, portable, or mobile hand-carried implementations. In an example, communication device 100f maintains user records 124. Specifically, user record 124a authenticates and identifies first user 323a with full access rights to communication device 100e. User record 124b authenticates and identifies second user 323b with limited access rights to communication device 100f. User record 124c identifies third user 323c with a different set of limited access rights (which may include no access) to communication device 100f. Fourth user 323d is not yet represented in user records 124 but may be added. AR display device 101, worn by user 323e, which can be one of first through fourth users 323a-323d, and has FOV 213 and gaze direction 237 that encompasses object 227. Communication interface 303 of communication device 100f communicatively connects communication device 100f to AR display device 101 via one of an interlinked connection, wired (tethered) connection, a networked connection, and a wireless connection. Controller 110 of communication device 100 receives image stream 119a from AR display device 101. Controller 110 identifies objects within image stream 119a, including object 227. To identify object 227, controller 110 can perform object recognition and identification using image library 121 (FIG. 1), determine a location of one of active objects 227 that corresponds to digital map 120 (FIG. 1) of objects, or receive a designation from user 323e of AR display device 101 that identifies object 227 at location 231. Location 231 can be a frequented place for exchanging private AR messages and replies between users 323a-323d. Communication device 100f identifies private AR messages 240 that are intended for one of users 323a-323d wearing a respective AR display device 101. Communication device 100f presents the private AR message 240 at AR display device 101a, such as by presenting AR notification 241 tethered at object 227. Communication device 100f identifies private AR messages 242 generated by user 323e that are intended for another user 323a-323d and confirms receipt of the message by presenting private AR messages 242 at AR display device 101a. In one or more embodiments, AR notification 243 is presented tethered at object 227. Communication device 100f hides (i.e., does not visually present) other AR messages 244 that are exchanged between other users 323a-323d while a first user is wearing AR display device 101a.

Figure 3B:
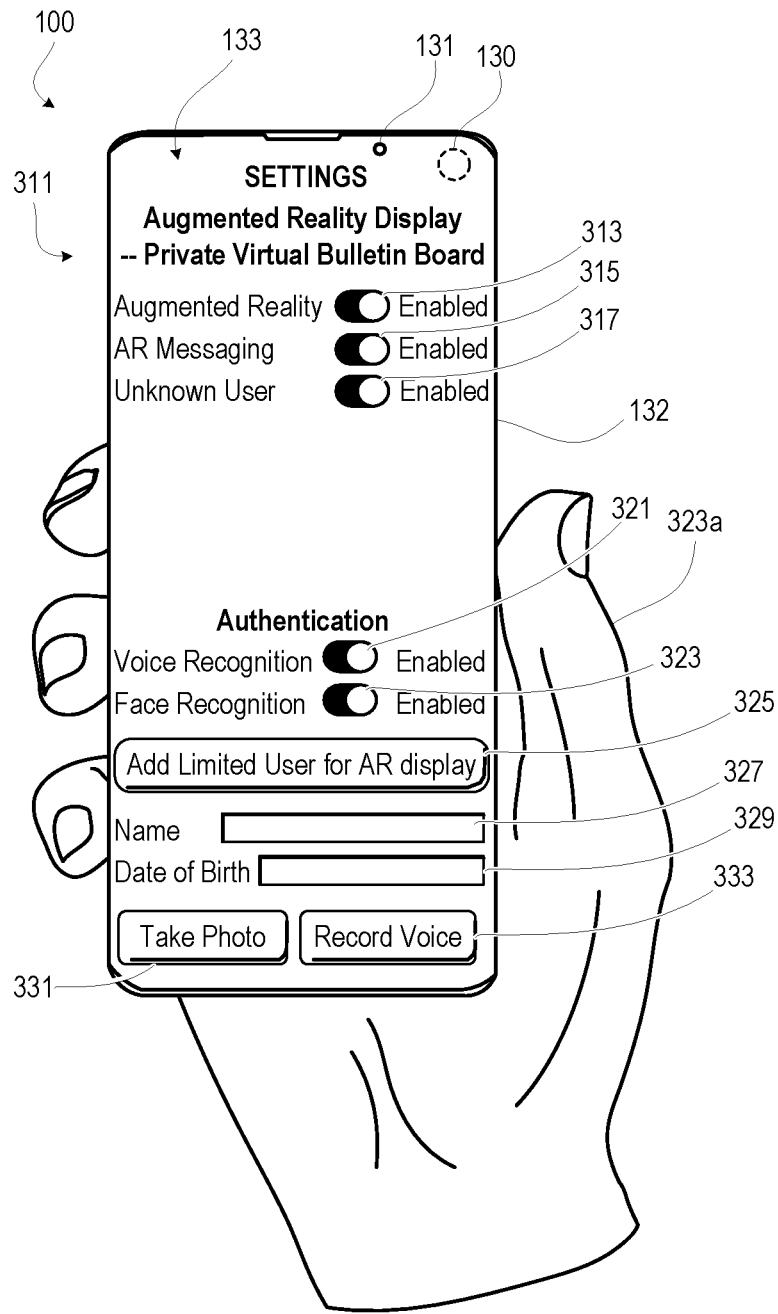
FIG. 3B depicts a sixth communication environment with the communication device presenting object-tethered AR notification content via the AR display device, according to one or more embodiments.

FIG. 3B depicts a front view of communication device 100 presenting user interface 133 on display device 132, enabling fully authorized first user 323a of communication device 100 to make or set user settings 311 for one or more of AR display devices 100a-100e (FIG. 1). Settings 311 include augmented reality functionality control 313 that manually toggles between enabling and disabling presentation of AR content at AR display devices 100a-100e (FIG. 1). Settings 311 include AR messaging control 315 that toggles between enabled and disabled. Settings 311 include unregistered user control 317, that enables or disables the capability of an unregistered user to leave an AR message. Settings 311 include authentication voice recognition control 321 that toggles between enabled and disabled. In an example, communication device 100 uses microphone 131 to obtain a voice sample for adding to user records 124 (FIG. 1). Settings 311 include authentication face recognition control 323 that toggles between enabled and disabled. In an example, communication device 100 uses image capturing device 130 to capture a facial image for adding to user records 124 (FIG. 1). Settings 311 include "add limited user" control 325 that enables a name selected in name field 327 to have limited or restricted use of a respective AR display devices 100a-100e (FIG. 1) or have limited or restricted access to content and/or messages presented at respective AR display devices 1001-100e. In one or more embodiments, "add limited user" control 325 also enables entry of associated date of birth (DOB) in DOB field 329 next to name field 327 of the user with limited or restricted access. During initial setup, the fully authorized user (first user 323a) of communication device 100 make select take photo control 331 and/or record voice control 333 to obtain biometric information for a new user such as a child to use for later authenticating the child at the communication device 100.

Figure 4:
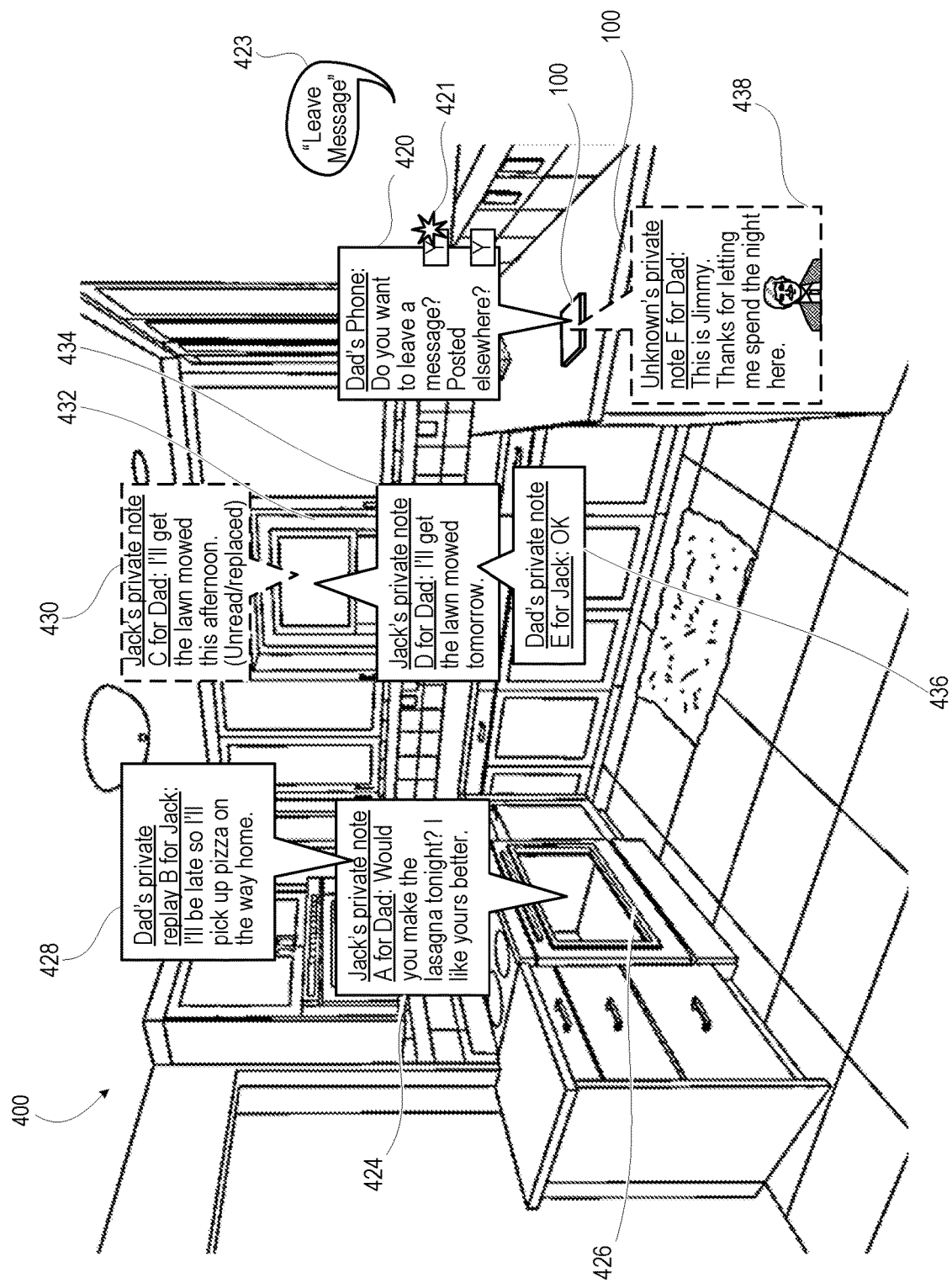
FIG. 4 depicts a perspective AR scene as viewed by an AR display device with object-tethered AR notification content visually presented as AR imagery, according to one or more embodiments.

FIG. 4 depicts a perspective AR scene 400 as viewed by AR display device 101 (FIG. 1). Communication device 100, which manages authorized AR messages, is left on the counter. When a user approaches or accesses AR display device, AR display device 101 (FIG. 1) attempts to recognize the user using various methodologies, including using sensors. ARNM application 111 (FIG. 1) provides a multi-user message management system that takes different actions based on whether the user is recognized as the owner of communication device 100 (e.g., first user 323a), is recognized as a known limited user of communication device 100 (e.g., second user 323b) or is determined to be an unregistered user of communication device 100 (e.g., fourth user 323d). If the user is recognized as the owner or a known user, the system receives user input and stores the user input as a note along with the name or other information identifying who the intended recipient of the note is. In one embodiment, the note is also stored along with the specific location where the message is intended to be delivered (e.g., the object to which the AR rendition of the note is to be tethered). In one or more embodiments, AR display device 101 (FIG. 1) is paired with communication device 100 such that messages received via AR display device 101 (FIG. 1) are assumed to be intended for the user owning the communication device 100 and AR display device 101 (FIG. 1). If the current user of communication device 100 is an unknown (i.e., unregistered) user, communication device 100 may not allow the user to leave a note at communication device 100. Alternatively, communication device 100 can be configured to allow the unregistered user to leave a note if additional identification data is also captured. Communication device prompts unregistered user to capture an image of the user and then enables the unregistered user to provide user input. Communication device 100 then stores the user input as a note associated with the captured image. When the owner of communication device 100 unlocks communication device 100 after a note has been left, AR display device 101 (FIG. 1) presents the note to the owner within the FOV of AR display device 101 (FIG. 1).

Communication device 100 (FIG. 1) provides management of the presentation of authorized messages (e.g., notes and replies) exchanged between an owner of the electronic device and other persons in a private manner using AR display device 101a. The other person can be a registered person having access credentials to the owner's communication device 100 or an unregistered persons, who can be allowed to leave a note via AR display device 101a along with identification data, such as a picture. Communication device 100 maintains the notes left by registered users. The person that has left the note may come back, access the maintained note, and revise the note so long as the intended recipient has not read ("consumed") the note yet. Communication device 100 maintains tracking of which notes have been read.

In the illustrative examples of FIG. 4, in response to identifying a user other than the owner and receiving a note creation input 421 (or note trigger command 423), an AR user interface 420 is presented at AR display device 101 (FIG. 1) to solicit/enable input of an AR note for the owning user. Person 123 (FIG. 1) can create messages by entering text using a virtual keypad that is displayed on AR display device 101a. First camera 211 (FIG. 2A) detects fingers of user virtually typing on virtual keypad. Alternatively, person 123 verbally dictates a new message that is stored in memory on communication device 100 (FIG. 1) or a remote network storage such as locally-networked device 173 (FIG. 1) to which communication device 100 is communicatively connected via a wired/wireless network.

In another example, when owning user views perspective AR scene 400, Jack's private note "A" 424 "Would you make lasagna tonight? I like yours better" is presented tethered to stove 426. In response, Dad's private reply "B" 428 "I'll be late, so I'll pick up pizza on the way home" is tethered to private note "A" 424. In an additional example, an unread private note "C" 430 "I'll get the lawn mowed this afternoon" from Jack to Dad is tagged to window 432: Since Dad did not read private note "C" 430, user Jack was able to later remove or edit note "C" and replace note "C" with private note "D" 434 "I'll get the lawn mowed tomorrow." Device owner, Dad, posts private note "E" 436 "OK" for Jack. In an additional example, depending on user settings, an unregistered user (i.e., a user who has not been provided with access credentials) may leave user note "F" 438 for the device owner stating: "This is Jimmy. Thanks for letting me spend the night." Communication device 100 prompts for and obtains a photo 440 to add to note "F" 438 to assist owner user in identifying the unregistered user. In one or more embodiments, the user is invited to provide, but not compelled to provide, photo 440. In one or more embodiments, the user is presented a license disclaimer that is clicked through acknowledging relinquishment of certain copyrights and data privacy if the user chooses to use the AR private messaging features provided by communication device 100 (FIG. 1). In one or more embodiments, any biometric or photographic information of the unregistered user is ephemeral and automatically deleted once viewed by owner. As an example, the unregistered user is a family friend who has not been previously added to a list of limited users of communication device 100 or AR display device 101 (FIG. 1).

Figure 5:
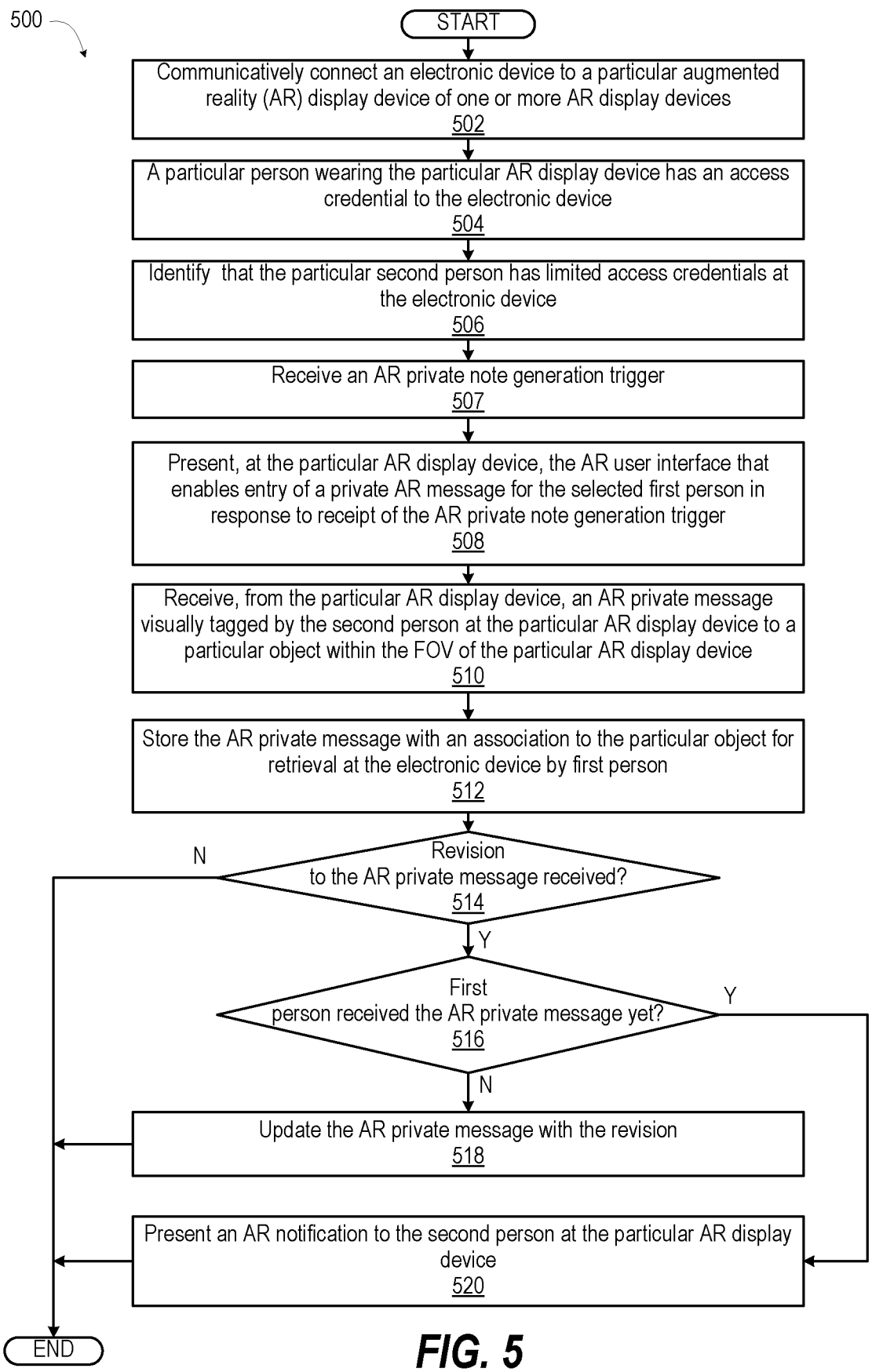
FIG. 5 presents a flow diagram of a method performed by the communication device for providing AR messaging for a first authorized device user by a second person wearing an AR display device, according to one or more embodiments.
Figure 6:
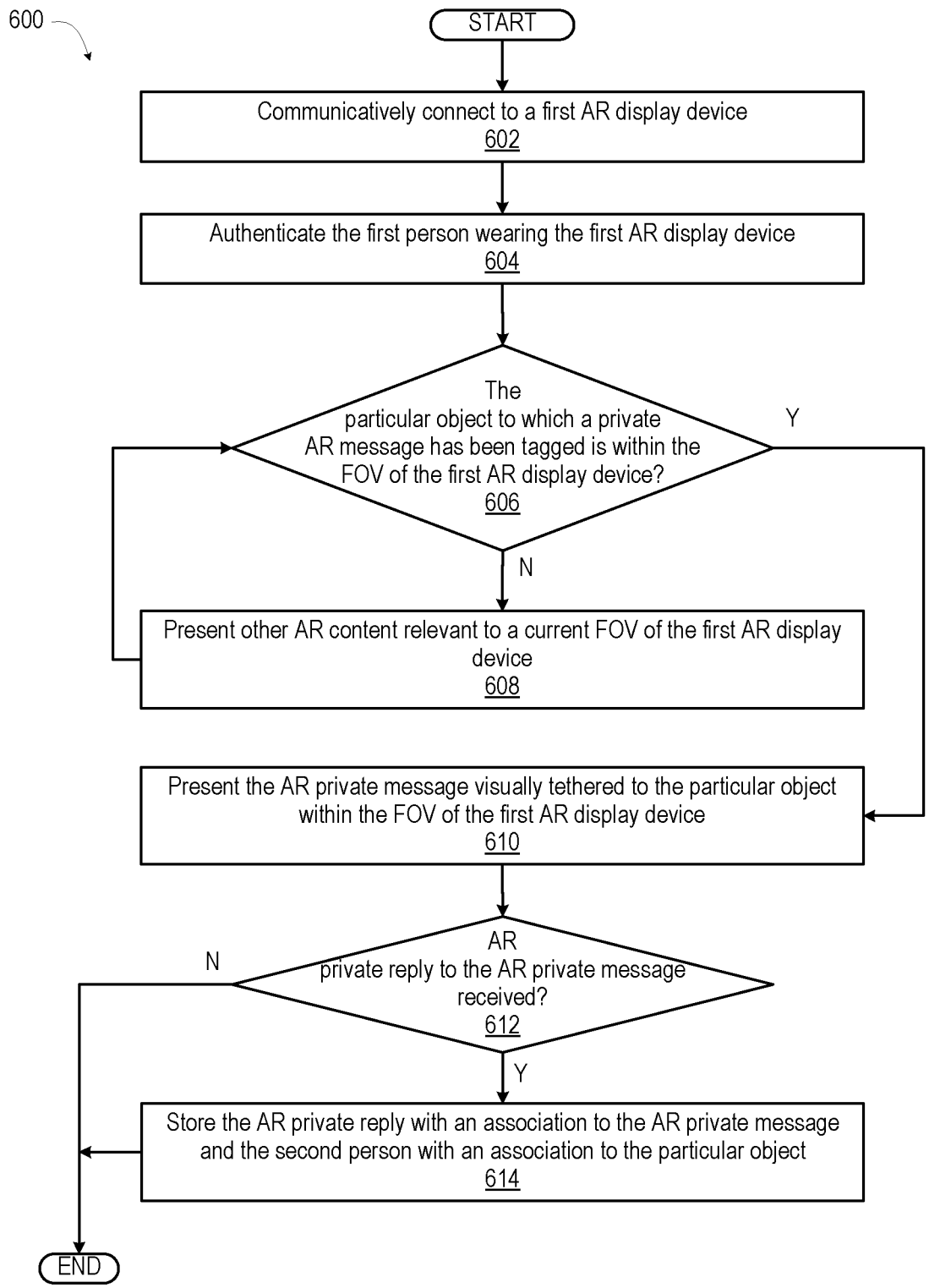
FIG. 6 presents a flow diagram of a method performed by the communication device for subsequently providing stored AR messaging for the first person wearing an AR display device, according to one or more embodiments.
Figure 7:
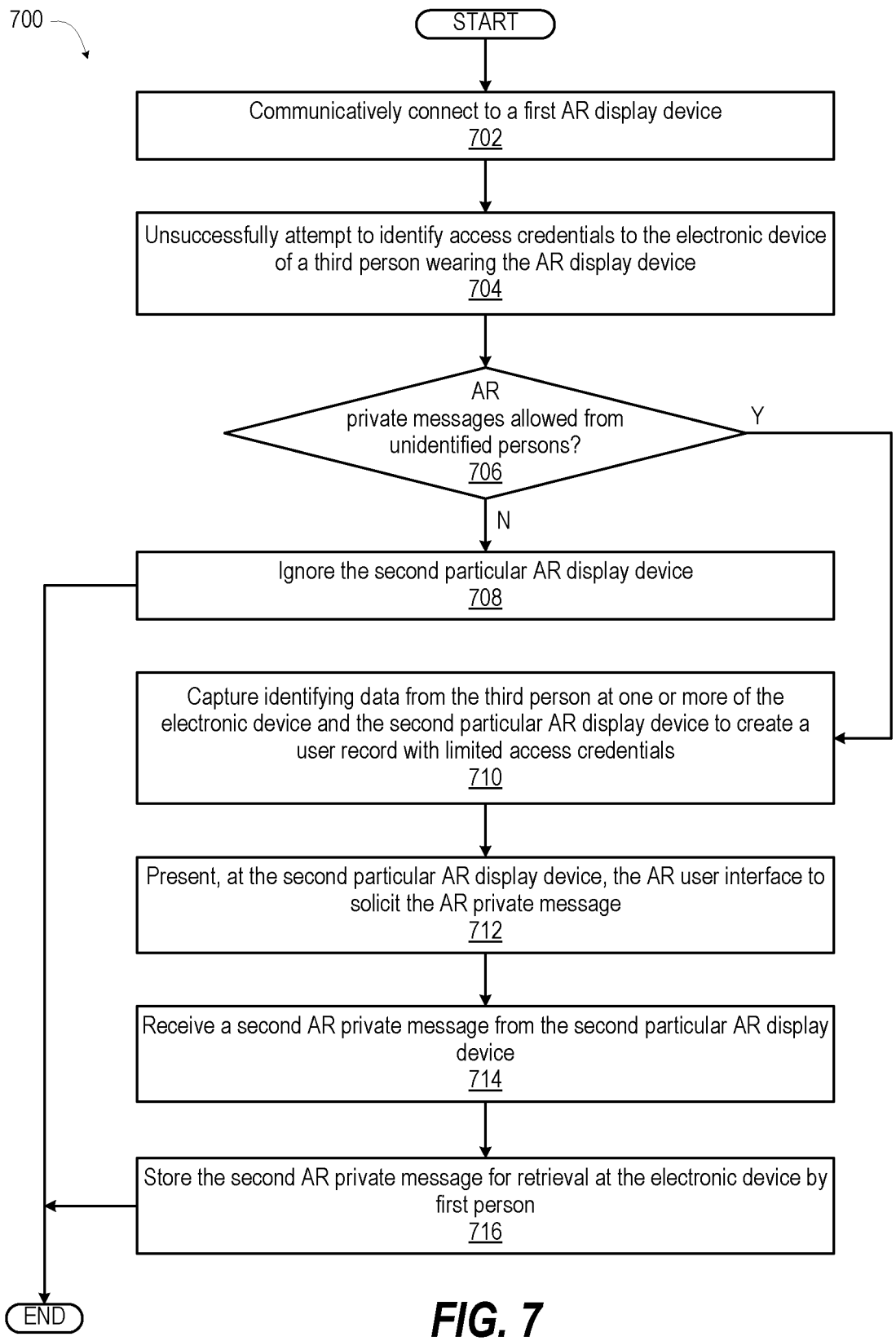
FIG. 7 presents a flow diagram of a method performed by the communication device for enabling AR messaging for a first authorized device user by an unregistered person wearing an AR display device that is communicatively or physically accessible to the first authorized device user, according to one or more embodiments.

With reference now to the flow charts, there are presented method 500 (FIG. 5), method 600 (FIG. 6), and method 700 (FIG. 7) performed by a communication device for providing AR messaging as a virtual private bulletin board or purposely positioned virtual post-it notes that are selectively presented within an AR display device interface of particular persons to whom the notes are addressed. As introduced within the preceding figures, the communication device is communicatively connected to the AR display devices, and in some embodiments are integrated within an AR display device assembly. The term communication device is thus understood to represent both embodiments. FIG. 5 presents a flow diagram of method 500 performed by the communication device, for providing private AR messaging for a first authorized device user by a second person wearing an AR display device. FIG. 6 presents a flow diagram of method 600 performed by the communication device for subsequently providing stored private AR messaging for the first person wearing an AR display device. FIG. 7 presents a flow diagram of method 700 performed by the communication device for enabling private AR messaging for a first authorized device user by a third person wearing an AR display device who is unregistered with the communication device. The descriptions of methods 500, 600, and 700 are provided with general reference to the specific components illustrated within the preceding FIGS. 1, 2A-2D, 3A-3B, and 4 and specific components referenced in methods 500, 600, and 700 may be identical or similar to components of the same name used in describing preceding FIGS. 1, 2A-2D, 3A-3B, and 4. In one or more embodiments, controller 110 configures communication device 100 and AR display device 101 (FIG. 1) to provide functionality of methods 500, 600, and 700.

With reference to FIG. 5, method 500 includes communicatively connecting an electronic device to a particular augmented reality (AR) display device of one or more AR display devices (block 502). Method 500 includes determining whether a particular person wearing the particular AR display device has an access credential to an electronic device (block 504). In one embodiment, the determining involves receiving or identifying an access credential of the particular person. Method 500 includes identifying that the particular person is a person, e.g., second user 123b (FIG. 3A), that has limited access credentials at the electronic device (block 506). Limited access credentials enable access to an AR user interface for leaving a private AR message intended for a selected first person who also has access credentials to the electronic device. Method 500 includes receiving an AR private note generation trigger (block 507) and in response to receipt of the AR private note generation trigger, presenting, at the particular AR display device, the AR user interface that enables entry of a private AR message for the selected first person (block 508). Method 500 includes receiving, from the user of the particular AR display device, an indication of a particular object within the FOV of the particular AR display device to which to visually tag the received AR private message (block 510). In an example, the user verbally dictates the received AR private message or uses a virtual keypad presented by the AR display device. The user also verbally or manually selects the object to which to tag the message. The particular object designated by the user for tagging with the conversation may be identified within digital map 120 maintained by the electronic device. The digital map provides a reference for locating the particular objects within the natural imagery observed by the AR display device. The tagged object may not have been previously tracked in digital map 120 and may be added for purposes of managing the tagged message (FIG. 1). In one or more embodiments, tagging a message to a particular object or location can ensure that the message and reply convey additional information and relevance by the location association. If no object is selected, the message is presented generally to the intended recipient without being associated with any objects in the FOV. In one or more embodiments, a particular exchange of messages and replies may not be tagged to a particular location or object but merely become available to view when the selected first person activates the AR display device.

Method 500 includes storing the AR private message with an association to the particular object for later presentation to the selected first person (block 512).

Method 500 includes determining whether a revision to the AR private message is received from the second person via the particular AR display device (decision block 514). In response to determining that the revision to the AR private message is not received, method 500 ends. In response to determining that the revision to the AR private message is received, method 500 includes determining whether the first person has already received the AR private message (decision block 516). In response to determining that the first person has not yet received the AR private message, method 500 includes updating the AR private message with the revision (block 518). In response to determining that the first person has already received the AR private message, method 500 includes presenting an AR notification to the second person at the particular AR display device that the AR private message has already been presented to the first person (block 520). The second person may choose to create a new note. Then method 500 ends.

With reference to FIG. 6, method 600 includes communicatively connecting to a first AR display device (block 602). The first AR display device may be the same as the particular AR display device previously used by the second person. Method 600 includes authenticating the first person wearing the first AR display device as having credential access to the communication device (block 604). Method 600 includes determining whether the particular object to which a private AR message has been tagged is within the FOV of the first AR display device (decision block 606). In response to determining that the particular object is not within the FOV of a first AR display device authenticated as being worn by the first person, method 600 includes presenting other AR content relevant to a current FOV of the first AR display device (block 608). Method 600 returns to decision block 606. In response to determining that the particular object is within the FOV of a first display device authenticated as being worn by the first person, method 600 includes presenting the AR private message visually tethered to the particular object within the FOV of the first AR display device (block 610). Method 600 includes determining whether an AR private reply to the AR private message is received from the first AR display device (decision block 612). In an example, the user verbally dictates the AR private message or uses a virtual keypad presented by the AR display device. In response to determining that an AR private reply to the AR private message is not received from the first AR display device, method 600 ends. In response to determining that an AR private reply to the AR private message is received from the first AR display device, method 600 includes storing the AR private reply associated with the AR private message for later retrieval and display to the second person when the second person is viewing the particular object via an AR display device (block 614). In an example, the electronic device tracks conversations of notes and replies that are explicitly linked by the users. In addition to being in linked conversations, the conversations may be further associated ("tagged") to particular objects. In one or more embodiments, a conversation of sequentially exchanges notes and replies can be extended with repeated use of one or more AR display devices by the first user and the second user.

With reference to FIG. 7, method 700 includes communicatively connecting communication device 100 to a second particular AR display device of the one or more AR display devices (block 702). The second particular AR display device may be the first AR display device, or another AR display device communicatively connected to the communication device to receive the posted messages from the first AR display device. Method 700 includes attempting to identify access credentials to the electronic device of a third person wearing the second particular AR display device (block 704). In response to failing to identify the third person or in response to the person not having access credentials for the electronic device, method 700 includes determining whether AR private messages are allowed from unidentified persons wearing an AR display device (decision block 706). In an example, the first user specifies the operation can extend to unregistered users, as described above for FIG. 3B. In response to determining that AR private messages are not allowed from unidentified persons wearing an AR display device, method 700 includes ignoring the request to open the user interface to create a private AR message on the second particular AR display device or otherwise preventing entry of an AR private message (block 708). Then method 700 ends. In response to determining that AR private messages are allowed from unidentified persons wearing an AR display device, method 700 includes capturing identifying data from the third person at one or more of the electronic device and the second particular AR display device to create a user record with limited access credentials (block 710). In an example, the communication device prompts the third person to position for a photograph, to verbally state their name, or to provide other assistance as a prerequisite for posting an AR private message for the first person. Method 700 includes presenting, at the second particular AR display device, the AR user interface to solicit the AR private message (block 712). Method 700 includes receiving a second AR private message from the second particular AR display device (block 714). In an example, the user verbally dictates the AR private message or uses a virtual keypad presented by the AR display device. Method 700 includes storing the second AR private message for later retrieval and presentation by the electronic device to the first person wearing the AR display device (block 716). Then method 700 ends. In an example, the second AR private message is not tethered to any particular object in the FOV. In another example, the second AR private message is tethered to the electronic device. In an additional example, the AR private message is tethered to another object designed by the third person via the AR display device.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
   at least one communication interface that communicatively connects the electronic device to one or more augmented reality (AR) display devices;
   a memory that stores at least two user records associated respectively with a first person having full access credentials to access the electronic device and a second person having limited access credentials to access the electronic device; and
   a controller communicatively coupled to the at least one communication interface and the memory, and which:
      in response to communicatively connecting to a particular AR display device of the one or more AR display devices, identifies whether a particular person wearing the particular AR display device has access credentials to access the electronic device;
      in response to identifying that the particular person is the second person with limited access credentials to access the electronic device:
         presents, at the particular AR display device, an AR user interface for leaving a private AR message intended for the first person who has full access credentials to the electronic device;
         receives an AR private message from the particular AR display device; and
         stores a received AR private message for later retrieval at the electronic device by first person; and
      in response to the particular person wearing the particular AR display being an unregistered user who does not have access credentials to access the electronic device:
         prompts the unregistered user to enter additional identification data;
         captures the additional identification data of the unregistered user; and
         in response to the unregistered user providing the additional identification data, enables the unregistered user to leave an AR message and stores the AR message associated with the additional identification data.

2. The electronic device of claim 1, wherein the controller:
   communicatively connects to a first AR display device;
   authenticates the first person wearing the first AR display device; and
   presents the AR private message at the first AR display device.

3. The electronic device of claim 2, wherein the controller:
   receives a revision from the second person to the AR private message via the particular AR device;
   in response to receiving the revision to the AR private message from the particular AR display device, determines whether the AR private message has already been presented to the first person; and
   updates the AR private message with the revision in response to determining that the AR private message has not yet been presented to the first person.

4. The electronic device of claim 3, wherein the controller:
   receives an AR private reply to the AR private message from the first AR display device worn by the first person;
   in response to receiving the AR private reply, stores the AR private reply with an association to the AR private message and the second person; and
   in response to determining that the electronic device is communicatively connected to the particular AR display device that is authenticated as being worn by the second person, presents the AR private reply at the particular AR display device for viewing by the second person.

5. The electronic device of claim 1, wherein the controller:
   receives the AR private message visually tagged by the particular AR display device to a particular object within a field of view (FOV) of the particular AR display device;
   stores the AR private message with an association to the particular object; and
   in response to determining that the particular object is within the FOV of a first display device authenticated as being worn by the first person, presents the AR private message visually tethered to the particular object within the FOV of the first AR display device.

6. The electronic device of claim 5, wherein the controller:
   receives an AR private reply to the AR private message from the first AR display device;
   stores the AR private reply with an association to the particular object; and
   in response to determining that the particular object is within the FOV of the first display device, presents the private reply visually tethered to the particular object within the FOV of the first AR display device.

7. The electronic device of claim 1, wherein the controller:
in response to subsequently communicatively connecting to a second particular AR display device of the one or more AR display devices, attempts to identify access credentials to the electronic device of a third person wearing the AR display device;
in response to failing to identify the third person that has no access credentials, at the electronic device, captures identifying data from the third person at one or more of the electronic device and the second particular AR display device to create a user record with limited access credentials;
presents, at the second particular AR display device, the AR user interface;
receives a second AR private message from the second particular AR display device; and
stores the second AR private message at the electronic device along with the identifying data of the third person for presentation to the first person with the identifying data.

8. The electronic device of claim 1, wherein the controller:
in response to subsequently communicatively connecting to a second particular AR display device of the one or more AR display devices, attempts to identify access credentials to the electronic device of a second particular person wearing the AR display device; and
in response to failing to identify that the particular person as having access credentials, at the electronic device, ignores the second particular AR display device.

9. The electronic device of claim 1, wherein the controller:
attempts to identify access credentials to the electronic device of the particular person wearing the particular AR display device further in response to determining that the electronic device is within a field of view (FOV) of the particular AR display device; and
presents, at the particular AR display device, the AR user interface visually tethered to the electronic device within the FOV of the particular AR display device.

10. A method comprising:
communicatively connecting an electronic device to a particular augmented reality (AR) display device of one or more AR display devices;
identifying whether a particular person wearing the particular AR display device has access credentials to access the electronic device;
in response to identifying that the particular person is a second person that has limited access credentials to access the electronic device:
presenting, at the particular AR display device, an AR user interface for leaving a private AR message intended for a first person who has full access credentials to the electronic device;
receiving an AR private message from the particular AR display device; and
storing a received AR private message for retrieval at the electronic device by first person; and
in response to the particular person wearing the particular AR display being an unregistered user who does not have access credentials to access the electronic device:
prompting the unregistered user to enter additional identification data;
capturing the additional identification data of the unregistered user; and
in response to the unregistered user providing the additional identification data, enabling the unregistered user to leave an AR message and storing the AR message associated with the additional identification data.

11. The method of claim 10, further comprising:
communicatively connecting to a first AR display device;
authenticating the first person wearing the first AR display device; and
presenting the AR private message at the first AR display device.

12. The method of claim 11, further comprising:
receiving a revision from the second person to the AR private message via the particular AR device;
in response to receiving a revision to the AR private message from the particular AR display device, determining whether the AR private message has been presented to the first person; and
updating the AR private message with the revision in response to determining that the AR private message has not yet been presented at the first person.

13. The method of claim 12, further comprising:
receiving an AR private reply to the AR private message from the first AR display device worn by the first person;
storing the AR private reply with an association to the AR private message and the second person; and
in response to determining that the electronic device is communicatively connected to the particular AR display device that is authenticated as being worn by the second person, presenting the AR private reply at the particular AR display device.

14. The method of claim 10, further comprising:
receiving the AR private message visually tagged by the particular AR display device to a particular object within a field of view (FOV) of the particular AR display device;
storing the AR private message with an association to the particular object; and
in response to determining that the particular object is within the FOV of a first display device authenticated as being worn by the first person, presenting the AR private message visually tethered to the particular object within the FOV of the first AR display device.

15. The method of claim 14, further comprising:
receiving an AR private reply to the AR private message from the first AR display device;
storing the AR private reply with an association to the particular object; and
in response to determining that the particular object is within the FOV of the first display device, presenting the private reply visually tethered to the particular object within the FOV of the first AR display device.

16. The method of claim 10, further comprising:
in response to subsequently communicatively connecting to a second particular AR display device of the one or more AR display devices, attempting to identify access credentials to the electronic device of a third person wearing the AR display device;
in response to failing to identify the third person that has no access credentials, at the electronic device, capturing identifying data from the third person at one or more of the electronic device and the second particular AR display device to create a user record with limited access credentials;

presenting, at the second particular AR display device, the AR user interface;
receiving a second AR private message from the second particular AR display device; and
storing the second AR private message at the electronic device for presentation to the first person.

17. The method of claim 10, further comprising:
in response to subsequently communicatively connecting to a second particular AR display device of the one or more AR display devices, attempting to identify access credentials to the electronic device of a second particular person wearing the AR display device; and
in response to failing to identify that the particular person as having access credentials, at the electronic device, ignoring the second particular AR display device.

18. The method of claim 10, further comprising:
attempting to identify access credentials to the electronic device of the particular person wearing the particular AR display device further in response to determining that the electronic device is within a field of view (FOV) of the particular AR display device; and
presenting, at the particular AR display device, the AR user interface visually tethered to the electronic device within the FOV of the particular AR display device.

19. A computer program product comprising:
a computer readable storage device; and
program code on the computer readable storage device that when executed by a processor associated with an electronic device, the program code enables the electronic device to provide functionality of:
communicatively connecting an electronic device to a particular augmented reality (AR) display device of one or more AR display devices;
identifying whether a particular person wearing the particular AR display device has access credentials to access the electronic device;
in response to identifying that the particular person is a second person that has limited access credentials to access the electronic device:
presenting, at the particular AR display device, an AR user interface for leaving a private AR message intended for a first person who has full access credentials to the electronic device;
receiving an AR private message from the particular AR display device; and
storing a received AR private message for retrieval at the electronic device by first person; and
in response to the particular person wearing the particular AR display being an unregistered user who does not have access credentials to access the electronic device:
prompting the unregistered user to enter additional identification data;
capturing the additional identification data of the unregistered user; and
in response to the unregistered user providing the additional identification data, enabling the unregistered user to leave an AR message and storing the AR message associated with the additional identification data.

20. The computer program product of claim 19, wherein the program code enables the electronic device to provide the functionality of:
communicatively connecting to a first AR display device;
authenticating the first person wearing the first AR display device; and
presenting the AR private message at the first AR display device.

* * * * *